US007424746B1

(12) United States Patent
Magdych et al.

(10) Patent No.: US 7,424,746 B1
(45) Date of Patent: *Sep. 9, 2008

(54) INTRUSION DETECTION AND VULNERABILITY ASSESSMENT SYSTEM, METHOD AND COMPUTER PROGRAM PRODUCT

(75) Inventors: James S. Magdych, Chino, CA (US); Tarik Rahmanovic, Germantown, MD (US); John R. McDonald, Jacksonville, FL (US); Brock E. Tellier, Stamford, CT (US)

(73) Assignee: McAfee, Inc., Santa Clara, CA (US)

(*) Notice: Subject to any disclaimer, the term of this patent is extended or adjusted under 35 U.S.C. 154(b) by 781 days.

This patent is subject to a terminal disclaimer.

(21) Appl. No.: 10/406,710

(22) Filed: Apr. 2, 2003

Related U.S. Application Data (63) Continuation of application No. 10/006,550, filed on Nov. 30, 2001, now Pat. No. 6,546,493.

(51) Int. Cl.
*G08B 23/00* (2006.01)
*H04K 1/00* (2006.01)
*H04L 9/00* (2006.01)
*G06F 12/14* (2006.01)
*G06F 11/30* (2006.01)

(52) U.S. Cl. .............. 726/25; 726/1; 726/22; 726/23; 726/24; 709/223; 709/224; 713/188

(58) Field of Classification Search .......... 726/1, 726/22–25; 713/188; 709/223–224
See application file for complete search history.

(56) References Cited

U.S. PATENT DOCUMENTS

| 5,905,859 | A | * | 5/1999 | Holloway et al. ........ 726/22 |
| 5,933,498 | A |   | 8/1999 | Schneck et al. ........ 705/54 |
| 5,960,170 | A |   | 9/1999 | Chen et al. ........ 395/183.14 |
| 5,991,881 | A |   | 11/1999 | Conklin et al. ........ 713/201 |
| 6,088,804 | A | * | 7/2000 | Hill et al. ........ 726/25 |
| 6,240,530 | B1 |   | 5/2001 | Togawa ........ 714/38 |
| 6,279,113 | B1 |   | 8/2001 | Vaidya ........ 713/201 |
| 6,298,445 | B1 | * | 10/2001 | Shostack et al. ........ 726/25 |
| 6,301,668 | B1 | * | 10/2001 | Gleichauf et al. ........ 726/25 |
| 6,484,203 | B1 |   | 11/2002 | Porras et al. ........ 709/224 |

(Continued)

FOREIGN PATENT DOCUMENTS

WO 01/38999 A1 5/2001

OTHER PUBLICATIONS

Advisory Action from U.S. Appl. No. 10/011,165 which was mailed on Dec. 1, 2005.

(Continued)

*Primary Examiner*—Ayaz Sheikh
*Assistant Examiner*—Trang Doan
(74) *Attorney, Agent, or Firm*—Zilka-Kotab, PC; Christopher J. Harnaty (57) ABSTRACT

A system and associated method/computer program product are provided including an intrusion detection tool for determining whether network communications violate at least one of a plurality of policies. Such policies are defined to detect potential attacks in the network communications. Further included is a vulnerability assessment scanning tool coupled to the intrusion detection tool. The vulnerability assessment scanning tool is adapted for performing a vulnerability assessment scan for identifying vulnerabilities.

16 Claims, 5 Drawing Sheets

U.S. PATENT DOCUMENTS

| | | | |
|---|---|---|---|
| 6,499,107 B1 * | 12/2002 | Gleichauf et al. | 726/23 |
| 6,546,493 B1 | 4/2003 | Magdych et al. | 713/201 |
| 6,574,737 B1 | 6/2003 | Kingsford et al. | 713/201 |
| 6,711,127 B1 | 3/2004 | Gorman et al. | 370/230 |
| 2002/0087882 A1 * | 7/2002 | Schneier et al. | 713/201 |
| 2003/0061506 A1 * | 3/2003 | Cooper et al. | 713/201 |
| 2003/0065945 A1 * | 4/2003 | Lingafelt et al. | 713/201 |
| 2003/0135749 A1 * | 7/2003 | Gales et al. | 713/200 |

OTHER PUBLICATIONS

Office Action Summary from U.S. Appl. No. 10/011,165 which was mailed on Aug. 17, 2005.

Office Action Summary from U.S. Appl. No. 10/011,165 which was mailed on Apr. 28, 2005.

The Examiner's Answer from U.S. Appl. No. 10/011,165 which was mailed on Mar. 31, 2006.

* cited by examiner

INTRUSION DETECTION AND VULNERABILITY ASSESSMENT SYSTEM, METHOD AND COMPUTER PROGRAM PRODUCT

RELATED APPLICATION(S)

The present application is a continuation of an application filed Nov. 30, 2001 under Ser. No. 10/006,550, now U.S. Pat. No. 6,546,493 and which is incorporated herein by reference. The present application is related to a co-pending application entitled "SYSTEM, METHOD AND COMPUTER PROGRAM PRODUCT FOR IMPROVING COMPUTER NETWORK INTRUSION DETECTION BY RISK PRIORITIZATION" which was filed Nov. 30, 2001 by the same inventor(s) under Ser. No. 10/011,165, and which is incorporated herein by reference.

FIELD OF THE INVENTION

The present invention relates to intrusion detection scanning methods, and more particularly to improving intrusion detection scanning performance.

BACKGROUND OF THE INVENTION

Network security management is becoming a more difficult problem as networks grow in size and become a more integral part of organizational operations. Attacks on networks are growing both due to the intellectual challenge such attacks represent for hackers and due to the increasing payoff for the serious attacker. Furthermore, the attacks are growing beyond the current capability of security management tools to identify and quickly respond to those attacks. As various attack methods are tried and ultimately repulsed, the attackers will attempt new approaches with more subtle attack features. Thus, maintaining network security is on-going, ever changing, and an increasingly complex problem.

Computer network attacks can take many forms and any one attack may include many security events of different types. Security events are anomalous network conditions each of which may cause an anti-security effect to a computer network. Security events include stealing confidential or private information; producing network damage through mechanisms such as viruses, worms, or Trojan horses; overwhelming the network's capacities in order to cause denial of service, and so forth.

A variety of intrusion detection programs have been developed to detect and protect against threats to network security. As is known in the art, a common method of detecting these threats is to use a scanning engine to scan for known attacks against networked computers. These attacks can be identified by their unique "attack signature" which generally consists of a string of binary or text data. Upon the detection of an attack signature by the scanning engine, protective measures can be taken, including: sending alerts; intercepting harmful traffic; or disconnecting users who launch attacks.

Such intrusion detection programs are often positioned on a network to monitor traffic between a plurality of network devices. In use, a network administrator may set a sensitivity of an intrusion detection program which dictates a degree of certainty required before an event is determined to be a threat. In other words, by setting the intrusion detection program sensitivity low, fewer benign events will be misidentified as attacks, but the amount of actual attacks that go undetected may increase. On the other hand, by setting the intrusion detection program sensitivity high, more potential attacks will detected, but the amount of work required to differentiate between the misidentified events and actual attacks increases.

There is thus a need for a technique to decrease the workload of a network administrator by reducing the number of potential attacks which must be ascertained as actual attacks, while preventing any actual attacks from going undetected.

DISCLOSURE OF THE INVENTION

A system and associated method/computer program product are provided including an intrusion detection tool for determining whether network communications violate at least one of a plurality of policies. Such policies are defined to detect potential attacks in the network communications. Further included is a vulnerability assessment scanning tool coupled to the intrusion detection tool. The vulnerability assessment scanning tool is adapted for performing a vulnerability assessment scan for identifying vulnerabilities.

DESCRIPTION OF THE PREFERRED EMBODIMENTS

Figure 1:
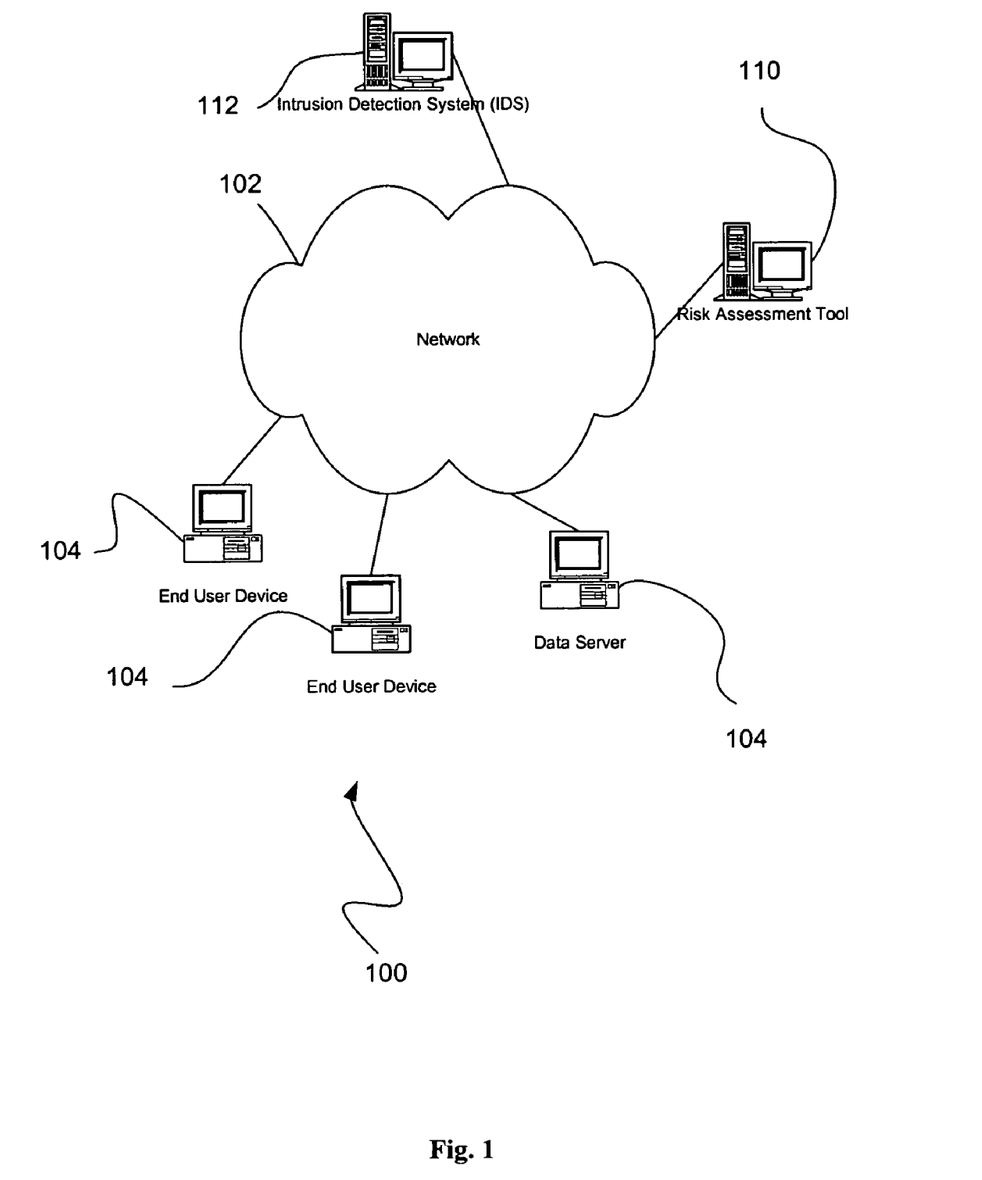
FIG. 1 illustrates an exemplary network environment, in accordance with one embodiment.

FIG. 1 illustrates a network architecture 100, in accordance with one embodiment. As shown, a network 102 is provided. In the context of the present network architecture 100, the network 102 may take any form including, but not limited to a local area network (LAN), a wide area network (WAN) such as the Internet, etc.

Coupled to the network 102 are data servers and end user computers 104 which are capable of communicating over the network 102. In the context of the present description, such data servers and end user computers 104 may include a web server, desktop computer, lap-top computer, hand-held computer, printer or any other type of hardware/software network device. More detail regarding an exemplary embodiment of such data servers and end user computers 104 will be set forth hereinafter during reference to FIG. 2.

Also included is a risk assessment scanning tool 110. In use, the risk assessment scanning tool 110 may be used to simulate an attack against one of the foregoing network devices via a remote or local connection. Such risk assessment scanning tool 110 can probe for network weaknesses by simulating certain types of security events that make up an attack. Such risk assessment scanning tool 110 may also test user passwords for suitability and security. Of course, the risk assessment scanning tool 110 may be used to identify any type of vulnerabilities of a system. More detail regarding an exemplary risk assessment scanning tool 110 will be set forth hereinafter during reference to FIG. 5.

The network architecture 100 further includes an intrusion detection tool 112. The intrusion detection tool 112 detects attacks or intrusions by scanning network communications between the various foregoing network devices. Of course, the intrusion detection tool 112 may also be capable of scanning executable files, application macro files, disk boot sectors, etc. This scanning may include comparing the network communications, etc. with a plurality of virus/attack signatures, known vulnerabilities and/or policies that may be constantly updated. Upon the detection of any of these by the intrusion detection tool 112, a remedying event may then be used to execute a risk assessment scan, report the problem, quarantine the infected communications, and/or extract the harmful information from the infected communications, thereby disinfecting the communications.

Of course, the intrusion detection tool 112 may be used to detect any type of intrusion, attack and/or policy violation on a system. More detail regarding an exemplary intrusion detection tool 112 will be set forth hereinafter during reference to FIGS. 5 and 6.

In one embodiment, the risk assessment scanning tool 110 may reside at a predetermined computer or server. Further, the intrusion detection tool 112 may reside on a gateway. As an option, the risk assessment scanning tool 110 and the intrusion detection tool 112 may reside on a similar network device, or even be integrally combined in a single module.

In use, network communications are monitored for violations of policies by the intrusion detection tool 112. It should be noted that such policies may or may not be user-defined. In any case, the policies may be defined to detect potential attacks in the network communications.

While the intrusion detection tool 112 is monitoring network communications, it is determined whether the network communications violate at least one of the policies. Further, a source of the network communications that violate at least one of the policies is identified. Upon it being determined that the network communications violate at least one of the policies, the source of the network communications is automatically scanned utilizing the risk assessment scanning tool 110. More information on an exemplary application of such technique will be set forth hereinafter in greater detail.

By this design, the intrusion detection tool 112 may monitor the network communications with a low sensitivity when determining whether the same exploit a plurality of known vulnerabilities. While, in the prior art, this would mean that actual attacks may go undetected, the present embodiment prevents this by scanning any source/destination of policy-violating, anomalous behavior using the risk assessment scanning tool 110. To this end, any potential attacks may be ruled out using a risk assessment scan without an increase in network administrator workload.

Figure 2:
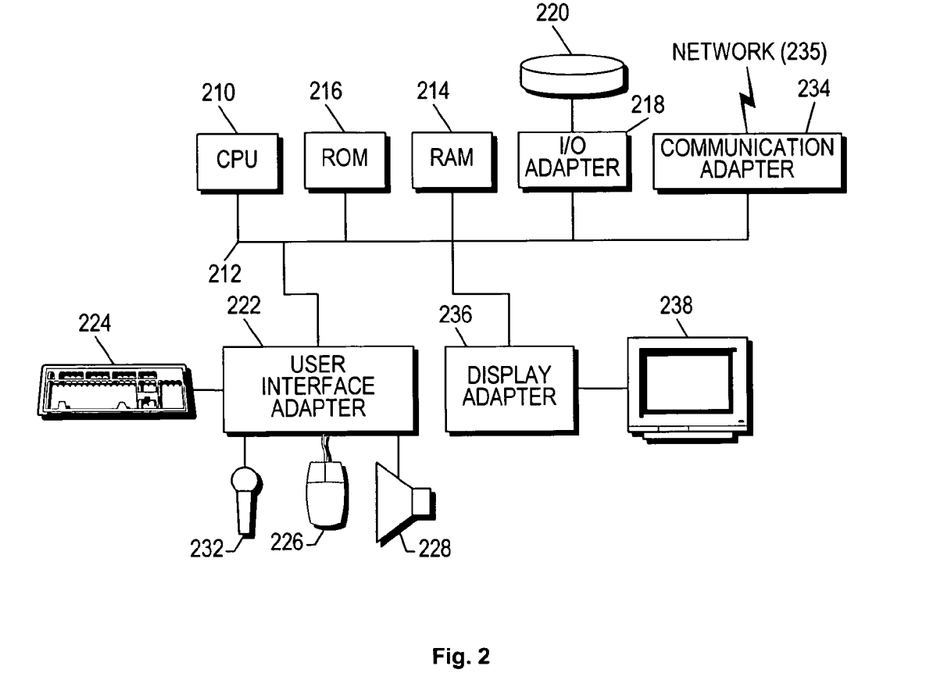
FIG. 2 shows a representative hardware environment associated with the computers of FIG. 1.

FIG. 2 shows a representative hardware environment that may be associated with the data servers and/or end user computers 104 of FIG. 1, in accordance with one embodiment. Such figure illustrates a typical hardware configuration of a workstation in accordance with a preferred embodiment having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows NT or Windows/95 Operating System (OS), the IBM OS/2 operating system, the MAC OS, or UNIX operating system. It will be appreciated that a preferred embodiment may also be implemented on platforms and operating systems other than those mentioned. A preferred embodiment may be written using JAVA, C, and/or C++ language, or other programming languages, along with an object oriented programming methodology. Object oriented programming (OOP) has become increasingly used to develop complex applications.

Figure 3:
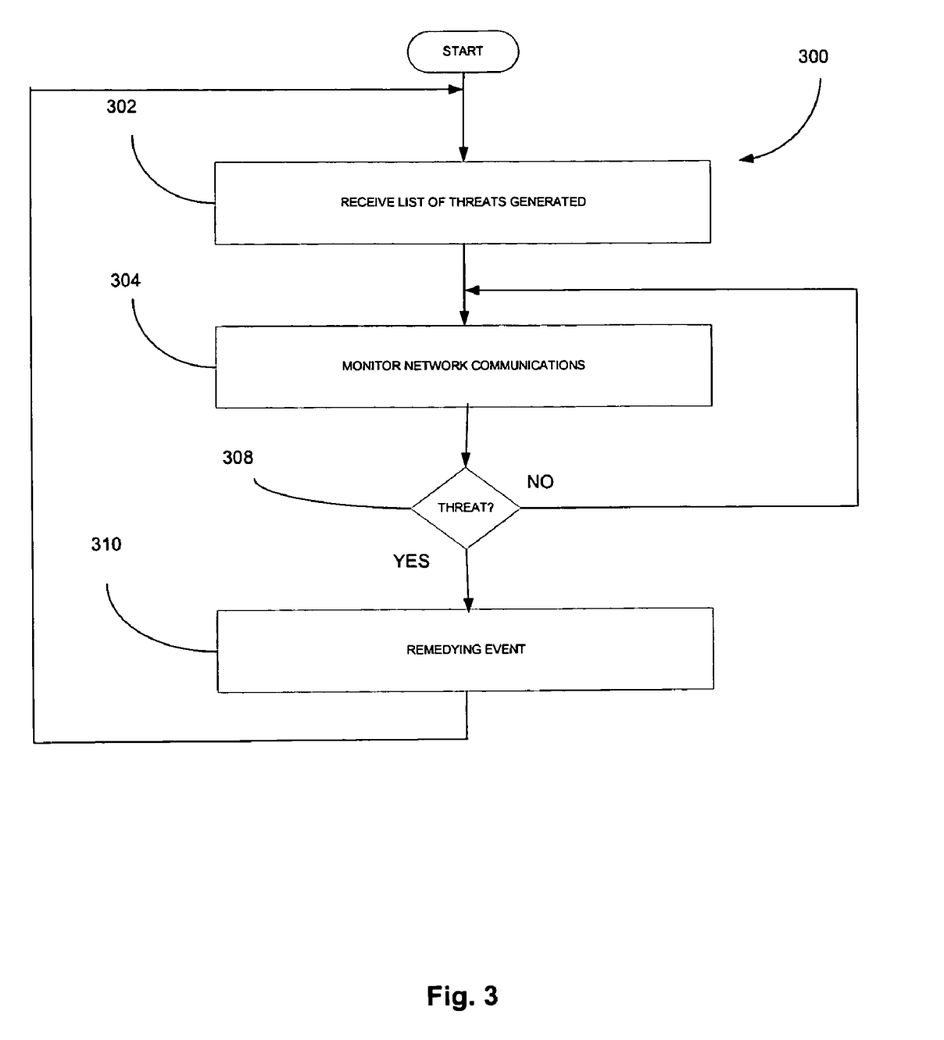
FIG. 3 is a flowchart of a method for detecting intrusions to a network, in accordance with one embodiment.

FIG. 3 is a flowchart of a method 300 for detecting intrusions to a network, in accordance with one embodiment. As an option, the present method 300 may be carried out in the context of the intrusion detection tool 112 of the network architecture 100 of FIG. 1. Of course, however, the present method 300 may be executed in any desired context and environment.

As shown, a list of threats in the form of known vulnerabilities and polices are first received in operation 302. This may be accomplished by simply querying a database or other type of memory, receiving the vulnerabilities and polices over a network, and/or any other technique.

As mentioned hereinabove, the vulnerabilities may include any type of vulnerability or weakness associated with a network device or architecture. More information on exemplary vulnerabilities will be set forth hereinafter in Table #1. Further, the policies may include any characteristics, rules, descriptions, etc. associated with network communications that reflect any potential of being an attack. For example, any anomalies may violate the policies. In one embodiment, the policies may be viewed as characteristics, rules, descriptions, etc. that may potentially characterize a vulnerability, but do not necessarily rise to the level of being a vulnerability.

In operation 304, network communications are monitored. In one embodiment, the network communications are monitored packet-by-packet.

It is then determined whether the currently network communications exploit a known vulnerability or violate a policy in decision 308. In other words, it is determined whether the network communications utilize the vulnerability in any way. More information on the manner in which threats are detected and handled will be set forth in greater detail during reference to FIG. 4.

If it is found that the network communications exploit a known vulnerability or violate a policy in decision 308, a remedying event is executed. Note operation 310. This remedying event may involve, but is not limited to executing a risk assessment scan, reporting the problem, quarantining the infected communications, and/or extracting the harmful information from the infected communications, thereby disinfecting the communications.

Figure 4:
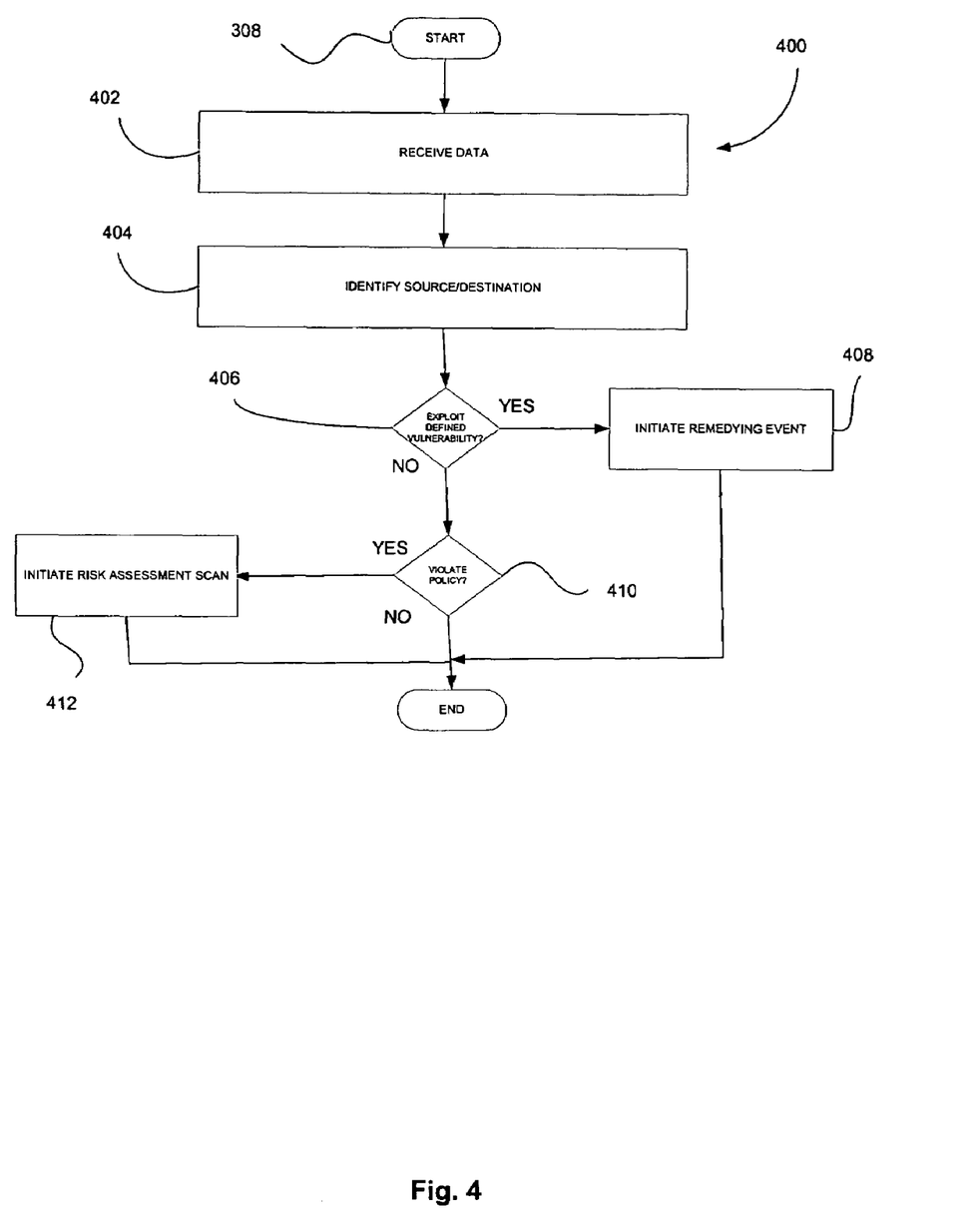
FIG. 4 illustrates a method by which it is determined that network communications are a threat per decision 308 of FIG. 3.

FIG. 4 illustrates a method 400 by which it is determined that network communications are a threat per decision 308 of FIG. 3. Initially, data associated with the network communications is received in operation 402. Again, this data may take the form of a packet, or any other component of network communications.

Next, a source and/or destination of the network communications is ascertained in operation 404 for reasons that will soon be set forth. It is then determined in decision 406 as to whether the network communications exploit a defined vulnerability mentioned in operation 302 of FIG. 3. Again, more information on exemplary vulnerabilities will be set forth hereinafter in Table #1.

If it is determined that a vulnerability is exploited in decision 406, a remedying event is initiated for deployment in operation 310 of FIG. 3, as prompted by operation 408. If not, another decision, decision 410, is made to determine whether any of the policies mentioned in operation 302 of FIG. 3 have been violated.

If so, a risk assessment scan is initiated in operation 412. It is optional as to whether the source and/or destination of the network communications identified in operation 404 is the subject of the risk assessment scan. It is further optional as to whether any additional form of a remedying event is initiated in conjunction with the risk assessment scan. More information on such risk assessment scan will be set forth during reference to FIG. 5.

Figure 5:
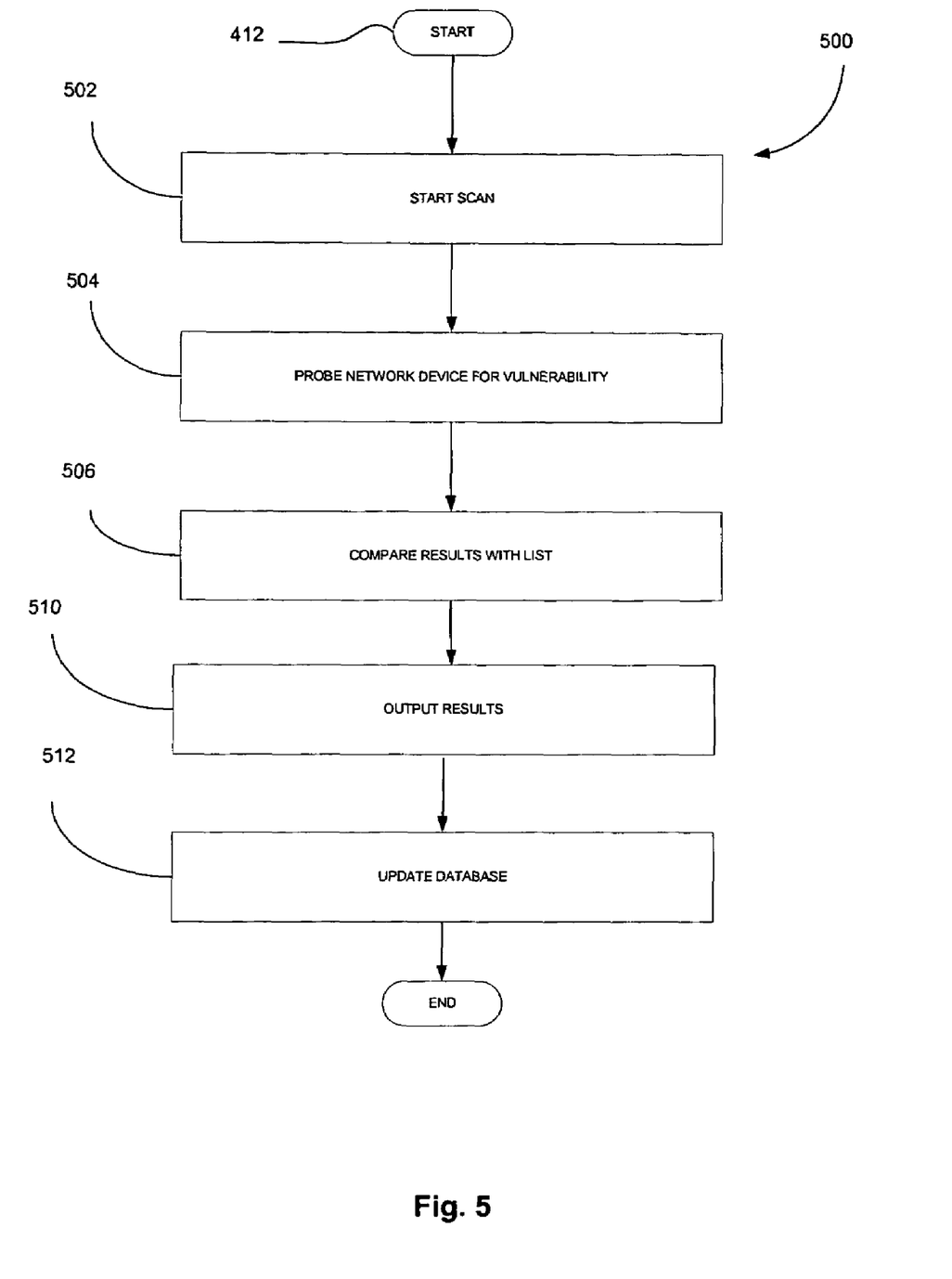
FIG. 5 illustrates a method for a risk assessment scan, in accordance with operation 412 of FIG. 4.

FIG. 5 illustrates a method 500 for a risk assessment scan, in accordance with operation 412 of FIG. 4. As an option, the present method 500 may be carried out in the context of the risk assessment scanning tool 110 of the network architecture 100 of FIG. 1. Of course, however, the present method 500 may be executed in any desired context and environment.

Initially, a scan is first started in operation 502. This initiation by the intrusion detection tool 112 in operation 412 of FIG. 4. Next, the source and/or destination network device is identified and probed for a vulnerability in operation 504. For example, in operation 504, network weaknesses may be probed by simulating certain types of security events that make up an attack.

Table 1 sets forth more information on an exemplary set of vulnerability probes. It is important to note that this set of vulnerability probes is merely illustrative in nature and should not be construed as limiting in any manner.

TABLE 1

STAT (file)
Arguments:
file - name of the file to stat
Function:
This vulnerability probe takes a file and performs a
stat system call and returns a result.
READ (file, start, end)
Arguments:
file - name of the file to read
start - starting position in file
end - ending position in file
Function:
This vulnerability probe opens and reads a file, with
optional starting and ending parameters. This allows
the administrator to read/dev/kmem/parse.
READDIR (dir)
Arguments:
dir - directory to read
Function:
This vulnerability probe uses getdents ( ) or readdir ( )
to return the contents of a directory.
FIND (start, function, arg)
Arguments:
start - place in fs tree to start find
function - function to use when finding files including
the following:
    name - find files named arg
    perm - arg specifies permission mask for
    finding files
    arg - see function
Function:
This vulnerability probe returns a list of files that
are matched by the specified function. Since FIND is an
expensive operation, multiple filters may be set, and a
RUNFIND command may be executed which returns the
result. This way, the entire tree is only recursed once.
GETPWENT
Function:
This vulnerability probe retrieves an entry from the
password database. Each call gets the next entry.
GETGRENT
Function:

TABLE 1-continued

This vulnerability probe retrieves an entry from the
group database. Each call gets the next entry.
CHKSUM (file)
Arguments:
file - name of the file to checksum
Function:
This vulnerability probe performs a checksum/hash of a
file. It may be used for checking against a list of
known hashes for OS distributions for sensitive binaries
and libs.
EXEC (file, args)
Arguments:
file - name of file to execute
args - initial arguments
Function:
This vulnerability probe is used to execute an arbitrary
command on the system. If a child was terminated by a
signal, this information should be returned. This
vulnerability probe may be used for testing particular
files for buffer overflows, and could also be used for
running ndd and sysctl in order to determine kernel
parameters.

In the context of the present description, a vulnerability may include any characteristic that may make a network device or architecture more susceptible to an intrusion or attack.

Results generated by this probing of operation 504 may then be compared against a list of known vulnerabilities in operation 506. By this design, any known vulnerabilities are identified by the present method 500.

Once complete, the results in the form of any additional known vulnerabilities are outputted in operation 510. As an option, the results may be used to update the database of threats (i.e. vulnerabilities and polices) mentioned hereinabove in operation 302 of FIG. 3. Note operation 512. As such, future use of such database by the intrusion detection tool 112 may include the known vulnerabilities outputted in operation 510. Thus, there is a feedback mechanism between the risk assessment scanning tool 110 and intrusion detection tool 112.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
monitoring network communications for violations of policies where the policies are defined to detect potential attacks in the network communications, utilizing an intrusion detection system;
performing a vulnerability assessment scan for identifying vulnerabilities utilizing a vulnerability assessment system coupled to the intrusion detection system;
determining whether the network communications exploit at least one of a plurality of known vulnerabilities;
executing a remedying event if it is determined that the network communications exploit at least one of the plurality of known vulnerabilities; and
updating a database of known vulnerabilities based on the vulnerability assessment scan;
wherein the intrusion detection system and the vulnerability assessment system are integrated in a single module;
wherein the remedying event includes extracting harmful information from infected network communications.

2. The method as recited in claim 1, wherein the policies are user-defined.

3. The method as recited in claim 1, and further comprising executing the remedying event based on the vulnerability assessment scan.

4. The method as recited in claim 1, wherein the database of known vulnerabilities is utilized for the determining of whether the network communications exploit at least one of the plurality of known vulnerabilities.

5. A computer program product embodied on a tangible computer readable medium comprising:
   computer code for monitoring network communications for violations of policies where the policies are defined to detect potential attacks in the network communications, utilizing an intrusion detection system;
   computer code for performing a vulnerability assessment scan for identifying vulnerabilities, utilizing a vulnerability assessment system coupled to the intrusion detection system;
   computer code for determining whether the network communication exploit at least one of a plurality of known vulnerabilities;
   computer code for executing a remedying event if it is determined that the network communications exploit at least on of the plurality of known vulnerabilities; and
   computer code for updating a database of known vulnerabilities based on the vulnerability assessment scan;
   wherein the intrusion detection system and the vulnerability assessment system are integrated in a single module;
   wherein the remedying event includes code for extracting harmful information from infected network communications.

6. The computer program product as recited in claim 5, wherein the policies are user-defined.

7. The computer program product as recited in claim 5, further comprising computer code for executing the remedying event based on the vulnerability assessment scan.

8. The computer program product as recited in claim 5, wherein the database of known vulnerabilities is utilized for the determining of whether the network communications exploit at least one of the plurality of known vulnerabilities.

9. A system including a tangible computer readable medium, the system for scanning network communications, comprising:
   intrusion detection means for monitoring network communications for violations of policies where the policies are defined to detect potential attacks in the network communications, determining whether the network communications exploit at least one of a plurality of known vulnerabilities, and executing a remedying event if it is determined that the network communications exploit at least one of the plurality of known vulnerabilities; and
   vulnerabilities assessment means for performing a vulnerability assessment scan for identifying vulnerabilities, and updating a database of known vulnerabilities based on the vulnerability assessment scan;
   wherein the intrusion detection means and the vulnerability assessment means are integrated in a single module;
   wherein the remedying event includes extracting harmful information from infected network communications.

10. A system including a tangible computer readable medium, comprising:
   an intrusion detection tool for determining whether network communications violate at least one of a plurality of policies where the policies are defined to detect potential attacks in the network communications, determining whether the network communications exploit at least one of a plurality of known vulnerabilities, executing a remedying event if it is determined that the network communications exploit at least one of the plurality of known vulnerabilities; and
   a risk assessment scanning tool coupled to the intrusion detection tool, the risk assessment scanning tool adapted for performing a risk assessment scan for identifying vulnerabilities, and updating a database of known vulnerabilities based on the risk assessment scan;
   wherein the remedying event includes extracting harmful information from infected network communications;
   wherein the intrusion detection tool and the risk assessment scanning tool are embodied on the tangible computer readable medium.

11. The method as recited in claim 1, wherein the remedying event includes executing a risk assessment scan.

12. The method as recited in claim 1, wherein the remedying event includes reporting a problem.

13. The method as recited in claim 1, wherein the remedying event includes quarantining the infected network communications.

14. The method as recited in claim 1, wherein the intrusion detection system initiates the vulnerability assessment scan.

15. The method as recited in claim 1, wherein feedback is provided between the vulnerability assessment system and the intrusion detection system.

16. The method as recited in claim 1, wherein the database of known vulnerabilities is updated based on results of the vulnerability assessment scan, and the updated database of known vulnerabilities is subsequently utilized by the intrusion detection system.

\* \* \* \* \*

UNITED STATES PATENT AND TRADEMARK OFFICE
CERTIFICATE OF CORRECTION

PATENT NO. : 7,424,746 B1 Page 1 of 1
APPLICATION NO. : 10/406710
DATED : September 9, 2009
INVENTOR(S) : Magdych et al.

It is certified that error appears in the above-identified patent and that said Letters Patent is hereby corrected as shown below:

On the Title page,
Item [74]: Replace "Christopher J. Harnaty" with -- Christopher J. Hamaty --.

Signed and Sealed this

Twenty-sixth Day of October, 2010

David J. Kappos
*Director of the United States Patent and Trademark Office*